UNITED STATES PATENT OFFICE.

WILLIAM J. WOODS, OF ELMWOOD, ILLINOIS.

IMPROVEMENT IN REMEDIES FOR HOG-CHOLERA.

Specification forming part of Letters Patent No. 180,303, dated July 25, 1876; application filed March 4, 1876.

*To all whom it may concern:*

Be it known that I, WILLIAM J. WOODS, of Elmwood, in the county of Peoria, and in the State of Illinois, have invented a Medical Remedy for the Prevention and Cure of Hog-Cholera; and do hereby declare that the following is a full, clear, and exact description thereof.

Take one-half pound of copperas, one pound of black pepper, one-half pound of golden seal, two pounds of sal-soda, one pound of alum, one pound of hyposulphite of soda, one-half pound of yellow dock, one-half pound of sanguinaria, one-fourth of one pound of sal-niter, and one-half pound of poke-root. Pulverize these and mix together the whole of them, and keep them in a tight vessel. Separately prepare and mix six ounces of carbolic acid and four ounces of tincture of iodine with two ounces of water, and keep this mixture in a bottle.

In pursuing my treatment of remedy, it is best to separate the shotes from the fattening hogs when symptoms of cholera are developed. To perform a cure for the hog-cholera I mix one table-spoonful of the powdered mixture with thirty drops of the fluid for each animal. It may be fed or administered, in slop or swill, once or twice each day for the space of two weeks.

When the shotes begin to cough, during the administering of the medicine, it is best not to feed the animals with corn at all, as such food is heating and increases the inflammation, and counteracts the effect of the medicine.

As a preventive of cholera in hogs or shotes, the above-described mixture of the powder with the liquid medicine will cleanse the blood and expel worms and parasites, also increase the action of the liver and kidneys.

What I claim as my invention is—

The medicine for the prevention and cure of hog-cholera, composed of copperas, black pepper, golden seal, sal-soda, alum, hyposulphite of soda, yellow-dock root, sanguinaria, sal-niter, poke-root, carbolic acid, and tincture of iodine, in about the proportions and for the purposes hereinbefore set forth and described.

In testimony that I claim the foregoing medicine for the prevention and cure of hog-cholera I have hereunto set my hand this 28th day of February, A. D. 1876.

WILLIAM J. WOODS.

Witnesses:
 HENRY W. WELLS,
 JAMES M. MORSE